US011262231B1

(12) United States Patent
Berme et al.

(10) Patent No.: US 11,262,231 B1
(45) Date of Patent: Mar. 1, 2022

(54) SWIVEL FOOT ASSEMBLY FOR A FORCE PLATE OR BALANCE PLATE

(71) Applicant: Bertec Corporation, Columbus, OH (US)

(72) Inventors: Necip Berme, Worthington, OH (US); Sasan Ghassab, Columbus, OH (US)

(73) Assignee: Bertec Corporation, Columbus, OH (US)

( * ) Notice: Subject to any disclaimer, the term of this patent is extended or adjusted under 35 U.S.C. 154(b) by 0 days.

(21) Appl. No.: 17/334,602

(22) Filed: May 28, 2021

Related U.S. Application Data

(60) Provisional application No. 63/031,966, filed on May 29, 2020.

(51) Int. Cl.

| | |
|---|---|
| ***G01G 21/23*** | (2006.01) |
| ***G01G 19/44*** | (2006.01) |
| ***F16M 11/24*** | (2006.01) |
| ***G01G 23/00*** | (2006.01) |
| *A47B 91/16* | (2006.01) |

(52) U.S. Cl.
CPC ............ *G01G 21/23* (2013.01); *G01G 19/44* (2013.01); *G01G 23/002* (2013.01); *A47B 91/16* (2013.01); *F16M 11/24* (2013.01)

(58) Field of Classification Search
CPC ...... G01G 19/44; G01G 21/23; G01G 23/002; A47B 91/16; F16M 11/24
See application file for complete search history.

(56) References Cited

U.S. PATENT DOCUMENTS

| | | | | |
|---|---|---|---|---|
| 2,795,892 A * | 6/1957 | Lautenbacher | A47B 91/16 | 248/188.3 |
| 3,045,390 A * | 7/1962 | Tao | A47B 91/066 | 248/188.3 |
| 3,155,357 A * | 11/1964 | Kramcsak, Jr. | F16M 7/00 | 248/188.3 |
| 4,258,810 A * | 3/1981 | Susor | G01G 3/12 | 177/128 |
| 5,332,182 A * | 7/1994 | Weisz | F16M 7/00 | 248/188.4 |
| 5,600,104 A * | 2/1997 | McCauley | G01G 19/12 | 177/136 |
| 5,801,339 A * | 9/1998 | Boult | G01G 17/08 | 177/261 |
| 6,038,488 A | 3/2000 | Barnes et al. | | |
| 6,113,237 A | 9/2000 | Ober et al. | | |

(Continued)

*Primary Examiner* — Randy W Gibson
(74) *Attorney, Agent, or Firm* — The Law Office of Patrick F. O'Reilly III, LLC

(57) ABSTRACT

A swivel foot assembly for a force plate or balance plate is disclosed herein. The swivel foot assembly includes a foot attachment component including a stem portion and a body portion, the stem portion of the foot attachment component configured to be attached to a force plate or balance plate; and a foot base component including a receptacle for receiving the body portion of the foot attachment component, the foot base component configured to be disposed on a support surface. The swivel foot assembly is configured to accommodate an uneven support surface on which a force plate or balance plate is disposed so that a force measurement accuracy of the force plate or balance plate is not adversely affected by stresses resulting from the uneven support surface.

20 Claims, 9 Drawing Sheets

20 60 66 62 30 68 64 10

(56) References Cited

U.S. PATENT DOCUMENTS

| | | | |
|---|---|---|---|
| 6,152,564 A | 11/2000 | Ober et al. | |
| 6,295,878 B1 | 10/2001 | Berme | |
| 6,354,155 B1 | 3/2002 | Berme | |
| 6,389,883 B1 | 5/2002 | Berme et al. | |
| 6,936,016 B2 | 8/2005 | Berme et al. | |
| 6,936,776 B2 * | 8/2005 | Germanton | G01G 19/44 177/238 |
| 7,244,896 B2 * | 7/2007 | Honda | G01G 19/445 177/184 |
| 8,181,541 B2 | 5/2012 | Berme | |
| 8,315,822 B2 | 11/2012 | Berme et al. | |
| 8,315,823 B2 | 11/2012 | Berme et al. | |
| D689,388 S | 9/2013 | Berme | |
| D689,389 S | 9/2013 | Berme | |
| 8,543,540 B1 | 9/2013 | Wilson et al. | |
| 8,544,347 B1 | 10/2013 | Berme | |
| 8,643,669 B1 | 2/2014 | Wilson et al. | |
| 8,700,569 B1 | 4/2014 | Wilson et al. | |
| 8,704,855 B1 | 4/2014 | Berme et al. | |
| 8,764,532 B1 | 7/2014 | Berme | |
| 8,847,989 B1 | 9/2014 | Berme et al. | |
| D715,669 S | 10/2014 | Berme | |
| 8,902,249 B1 | 12/2014 | Wilson et al. | |
| 8,915,149 B1 | 12/2014 | Berme | |
| 9,032,817 B2 | 5/2015 | Berme et al. | |
| 9,043,278 B1 | 5/2015 | Wilson et al. | |
| 9,066,667 B1 | 6/2015 | Berme et al. | |
| 9,081,436 B1 | 7/2015 | Berme et al. | |
| 9,168,420 B1 | 10/2015 | Berme et al. | |
| 9,173,596 B1 | 11/2015 | Berme et al. | |
| 9,200,897 B1 | 12/2015 | Wilson et al. | |
| 9,277,857 B1 | 3/2016 | Berme et al. | |
| D755,067 S | 5/2016 | Berme et al. | |
| 9,404,823 B1 | 8/2016 | Berme et al. | |
| 9,414,784 B1 | 8/2016 | Berme et al. | |
| 9,468,370 B1 | 10/2016 | Shearer | |
| 9,494,459 B2 * | 11/2016 | Oneid | G01G 21/22 |
| 9,517,008 B1 | 12/2016 | Berme et al. | |
| 9,526,443 B1 | 12/2016 | Berme et al. | |
| 9,526,451 B1 | 12/2016 | Berme | |
| 9,558,399 B1 | 1/2017 | Jeka et al. | |
| 9,568,382 B1 | 2/2017 | Berme et al. | |
| 9,622,686 B1 | 4/2017 | Berme et al. | |
| 9,763,604 B1 | 9/2017 | Berme et al. | |
| 9,770,203 B1 | 9/2017 | Berme et al. | |
| 9,778,119 B2 | 10/2017 | Berme et al. | |
| 9,814,430 B1 | 11/2017 | Berme et al. | |
| 9,829,311 B1 | 11/2017 | Wilson et al. | |
| 9,854,997 B1 | 1/2018 | Berme et al. | |
| 9,916,011 B1 | 3/2018 | Berme et al. | |
| 9,927,312 B1 | 3/2018 | Berme et al. | |
| 10,010,248 B1 | 7/2018 | Shearer | |
| 10,010,286 B1 | 7/2018 | Berme et al. | |
| 10,085,676 B1 | 10/2018 | Berme et al. | |
| 10,117,602 B1 | 11/2018 | Berme et al. | |
| 10,126,186 B2 | 11/2018 | Berme et al. | |
| 10,216,262 B1 | 2/2019 | Berme et al. | |
| 10,231,662 B1 | 3/2019 | Berme et al. | |
| 10,264,964 B1 | 4/2019 | Berme et al. | |
| 10,331,324 B1 | 6/2019 | Wilson et al. | |
| 10,342,473 B1 | 7/2019 | Berme et al. | |
| 10,390,736 B1 | 8/2019 | Berme et al. | |
| 10,413,230 B1 | 9/2019 | Berme et al. | |
| 10,463,250 B1 | 11/2019 | Berme et al. | |
| 10,527,508 B2 | 1/2020 | Berme et al. | |
| 10,555,688 B1 | 2/2020 | Berme et al. | |
| 10,571,264 B2 * | 2/2020 | Gui | G01G 21/23 |
| 10,646,153 B1 | 5/2020 | Berme et al. | |
| 10,722,114 B1 | 7/2020 | Berme et al. | |
| 10,736,545 B1 | 8/2020 | Berme et al. | |
| 10,765,936 B2 | 9/2020 | Berme et al. | |
| 10,803,990 B1 | 10/2020 | Wilson et al. | |
| 10,853,970 B1 | 12/2020 | Akbas et al. | |
| 10,856,796 B1 | 12/2020 | Berme et al. | |
| 10,860,843 B1 | 12/2020 | Berme et al. | |
| 10,945,599 B1 | 3/2021 | Berme et al. | |
| 10,966,606 B1 | 4/2021 | Berme | |
| 11,033,453 B1 | 6/2021 | Berme et al. | |
| 2003/0216656 A1 | 11/2003 | Berme et al. | |
| 2008/0228110 A1 | 9/2008 | Berme | |
| 2011/0277562 A1 | 11/2011 | Berme | |
| 2012/0266648 A1 | 10/2012 | Berme et al. | |
| 2012/0271565 A1 | 10/2012 | Berme et al. | |
| 2015/0096387 A1 | 4/2015 | Berme et al. | |
| 2016/0245711 A1 | 8/2016 | Berme et al. | |
| 2016/0334288 A1 | 11/2016 | Berme et al. | |
| 2018/0024015 A1 | 1/2018 | Berme et al. | |
| 2019/0078951 A1 | 3/2019 | Berme et al. | |
| 2020/0139229 A1 | 5/2020 | Berme et al. | |
| 2020/0408625 A1 | 12/2020 | Berme et al. | |

* cited by examiner

SWIVEL FOOT ASSEMBLY FOR A FORCE PLATE OR BALANCE PLATE

CROSS-REFERENCE TO RELATED APPLICATIONS

This patent application claims priority to, and incorporates by reference in its entirety, U.S. Provisional Patent Application No. 63/031,966, entitled "Swivel Foot Assembly For A Force Plate Or Balance Plate", filed on May 29, 2020.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a swivel foot assembly for a force plate or balance plate. More particularly, the invention relates to a swivel foot assembly for a force plate or balance plate configured to accommodate an uneven support surface on which the force plate or balance plate is disposed so that the force measurement accuracy of the force plate or balance plate is not adversely affected by stresses resulting from the uneven support surface.

2. Background

Force measurement systems are utilized in various fields to quantify the reaction forces and moments exchanged between a body and support surface. For example, in biomedical applications, force measurement systems are used for gait analysis, assessing balance and mobility, evaluating sports performance, and assessing ergonomics. In order to quantify the forces and moments resulting from the body disposed thereon, the force measurement system includes some type of force measurement device. Depending on the particular application, the force measurement device may take the form of a balance plate, force plate, jump plate, an instrumented treadmill, or some other device that is capable of quantifying the forces and moments exchanged between the body and the support surface.

Force measurement systems are typically disposed inside a room within a building. Due to their high degree of measurement sensitivity, the accuracy of the output generated by these measurement systems may be adversely affected by the surface on which they are disposed. More specifically, when force measurement systems are mounted on uneven surfaces or surfaces with undulations, the resulting instability of the measurement instrument often leads to measurement errors (i.e., resulting from the rocking of the measurement instrument).

What is needed, therefore, is a swivel foot assembly for a force plate or balance plate configured to accommodate an uneven support surface on which the force plate or balance plate is disposed so that the force measurement accuracy of the force plate or balance plate is not adversely affected by stresses resulting from the uneven support surface.

BRIEF SUMMARY OF EMBODIMENTS OF THE INVENTION

Accordingly, the present invention is directed to a swivel foot assembly for a force plate or balance plate and a force plate or balance plate using the same that substantially obviates one or more problems resulting from the limitations and deficiencies of the related art.

In accordance with one or more embodiments of the present invention, there is provided a swivel foot assembly for a force plate or balance plate. The swivel foot assembly includes a foot attachment component including a stem portion and a body portion, the stem portion of the foot attachment component configured to be attached to a force plate or balance plate; and a foot base component including a receptacle for receiving the body portion of the foot attachment component, the foot base component configured to be disposed on a support surface. The swivel foot assembly is configured to accommodate an uneven support surface on which a force plate or balance plate is disposed so that a force measurement accuracy of the force plate or balance plate is not adversely affected by stresses resulting from the uneven support surface.

In a further embodiment of the present invention, the body portion of the foot attachment component comprises a ball portion, and the receptacle of the foot base component is configured to rotatably receive the ball portion of the foot attachment component.

In yet a further embodiment, the ball portion of the foot attachment component and the receptacle of the foot base component together form a ball-and-socket joint having three degrees of freedom.

In still a further embodiment, the stem portion of the foot attachment component comprises a fastener stud for attaching the foot attachment component to the force plate or balance plate.

In yet a further embodiment, the stem portion of the foot attachment component further comprises a collar portion disposed at a bottom of the fastener stud for limiting an insertion depth of the fastener stud into a component of the force plate or balance plate.

In still a further embodiment, the foot base component comprises a central collar portion and a peripheral rim portion surrounding the central collar portion, and the receptacle is disposed in the central collar portion.

In yet a further embodiment, the stem portion of the foot attachment component comprises a fastener aperture for receiving a fastener for attaching the foot attachment component to the force plate or balance plate.

In still a further embodiment, the swivel foot assembly further comprises a top plate component, the top plate component being attached to the foot base component, and the top plate component including an aperture for receiving the stem portion of the foot attachment component.

In yet a further embodiment, the top plate component is attached to the foot base component by one or more fastener members.

In still a further embodiment, the foot base component comprises a central raised portion and a peripheral rim portion, and the top plate component is attached to the central raised portion of the foot base component.

In accordance with one or more other embodiments of the present invention, there is provided a force plate or balance plate with a swivel foot assembly. The force plate or balance plate includes a top surface for receiving at least one portion of the body of a person; at least one force transducer, the at least one force transducer configured to sense one or more measured quantities and output one or more signals that are representative of forces and/or moments being applied to the top surface of the force plate or balance plate by the person; and at least one swivel foot assembly. The at least one swivel foot assembly includes a foot attachment component including a stem portion and a body portion, the stem portion of the foot attachment component attached to the force plate or balance plate; and a foot base component including a receptacle for receiving the body portion of the foot attachment component, the foot base component configured to be disposed on a support surface. The at least one swivel foot assembly is configured to accommodate an uneven support surface on which the force plate or balance plate is disposed so that a force measurement accuracy of the force plate or balance plate is not adversely affected by stresses resulting from the uneven support surface.

In a further embodiment of the present invention, the body portion of the foot attachment component of the at least one swivel foot assembly comprises a ball portion, and the receptacle of the foot base component is configured to rotatably receive the ball portion of the foot attachment component.

In yet a further embodiment, the ball portion of the foot attachment component and the receptacle of the foot base component together form a ball-and-socket joint having three degrees of freedom.

In still a further embodiment, the stem portion of the foot attachment component of the at least one swivel foot assembly comprises a fastener stud that attaches the foot attachment component to the force plate or balance plate.

In yet a further embodiment, the stem portion of the foot attachment component of the at least one swivel foot assembly further comprises a collar portion disposed at a bottom of the fastener stud that limits an insertion depth of the fastener stud into a component of the force plate or balance plate.

In still a further embodiment, the foot base component of the at least one swivel foot assembly comprises a central collar portion and a peripheral rim portion surrounding the central collar portion, and the receptacle is disposed in the central collar portion.

In yet a further embodiment, the stem portion of the foot attachment component of the at least one swivel foot assembly comprises a fastener aperture for receiving a fastener for attaching the foot attachment component to the force plate or balance plate.

In still a further embodiment, the at least one swivel foot assembly further comprises a top plate component, the top plate component being attached to the foot base component, and the top plate component including an aperture for receiving the stem portion of the foot attachment component.

In yet a further embodiment, the top plate component of the at least one swivel foot assembly is attached to the foot base component by one or more fastener members.

In still a further embodiment, the foot base component of the at least one swivel foot assembly comprises a central raised portion and a peripheral rim portion, and the top plate component is attached to the central raised portion of the foot base component.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF EMBODIMENTS OF THE INVENTION

Figure 1:
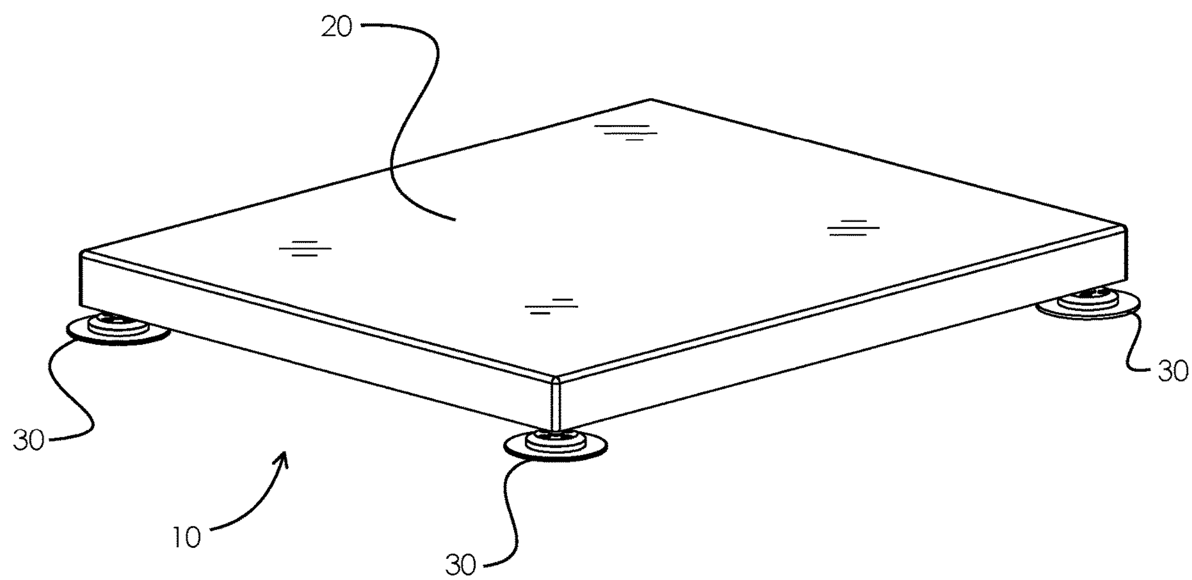
FIG. 1 is a perspective view of a force plate with a plurality of swivel foot assemblies, according to a first illustrative embodiment of the invention.

A first illustrative embodiment of a force plate with a plurality of swivel foot assemblies is seen generally at 10 in FIG. 1. In the first illustrative embodiment, the force plate 10 generally comprises a top plate component 20 with a top surface for receiving at least one portion of the body of a person; at least one force transducer 60 (see FIG. 4), the at least one force transducer 60 configured to sense one or more measured quantities and output one or more signals that are representative of forces and/or moments being applied to the top surface of the force plate 10 by the person; and a plurality of swivel foot assemblies 30 for supporting the force plate 10 on a support surface. In the first illustrative embodiment, referring collectively to FIGS. 2 and 3, each of the plurality of swivel foot assemblies 30 comprises a foot attachment component 40 including a stem portion 42 and a body portion 44, the stem portion 42 of the foot attachment component 40 being attached to the force plate 10; and a foot base component 50 including a receptacle or recess 56 for rotatably receiving the body portion 44 of the foot attachment component 40, the foot base component 50 configured to be disposed on a support surface (e.g., a floor of a building). The plurality of swivel foot assemblies 30 of the force plate 10 are configured to accommodate an uneven support surface on which the force plate 10 is disposed so that a force measurement accuracy of the force plate 10 is not adversely affected by stresses resulting from the uneven support surface (e.g., an uneven floor).

While the force plate 10 of the first illustrative embodiment is provided with a plurality of swivel foot assemblies 30, it is to be understood that, in other embodiments, the force plate 10 may have a single swivel foot assembly 30. In these other embodiments, the other feet of the force plate 10 may be non-swivel type foot assemblies.

Figure 2:
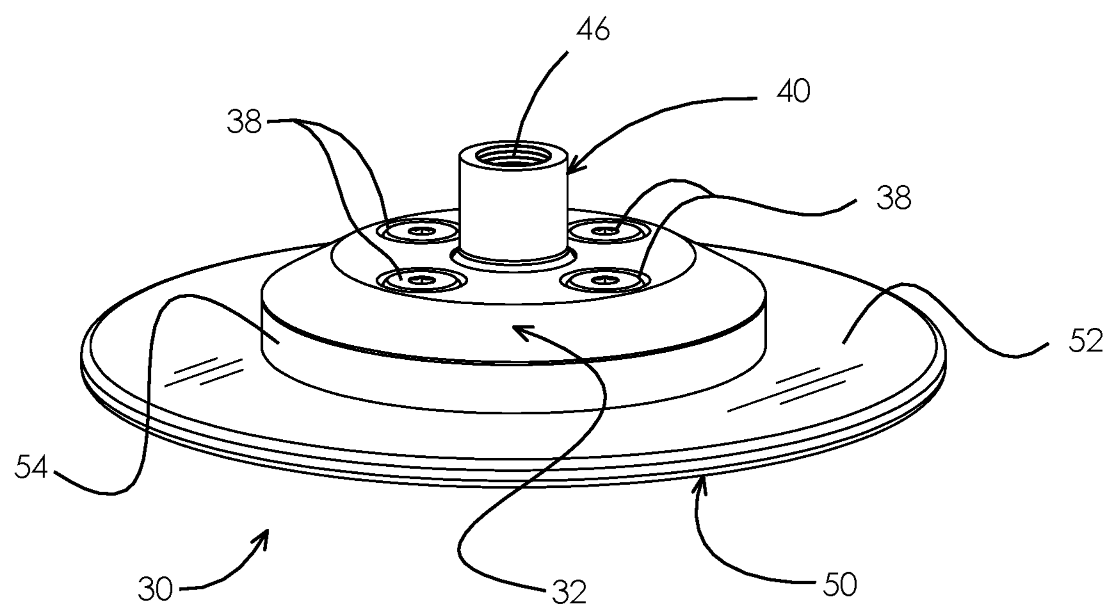
FIG. 2 is an assembled perspective view of one of the swivel foot assemblies illustrated in FIG. 1.
Figure 3:
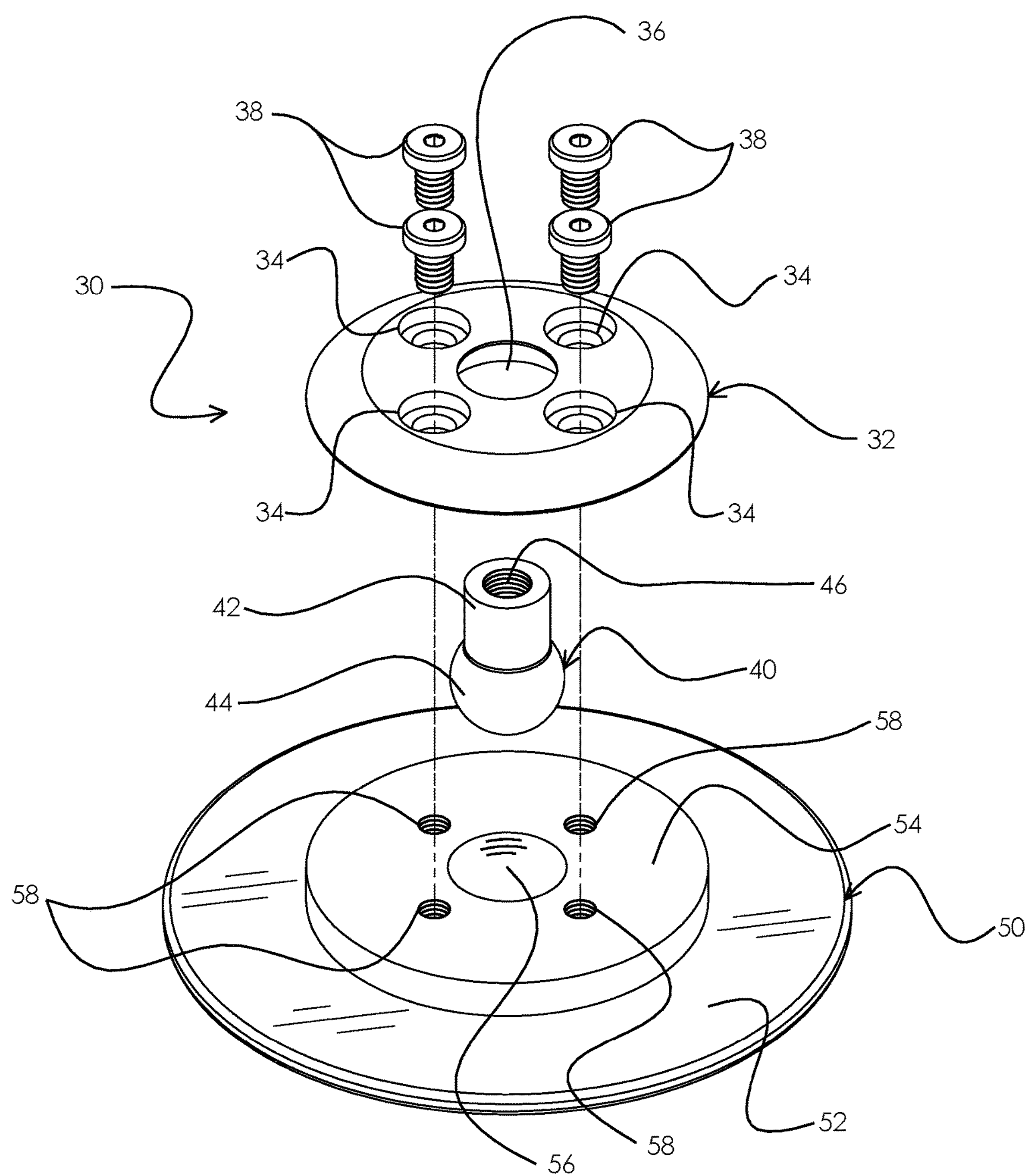
FIG. 3 is an exploded perspective view of the swivel foot assembly illustrated in FIG. 2.
Figure 4:
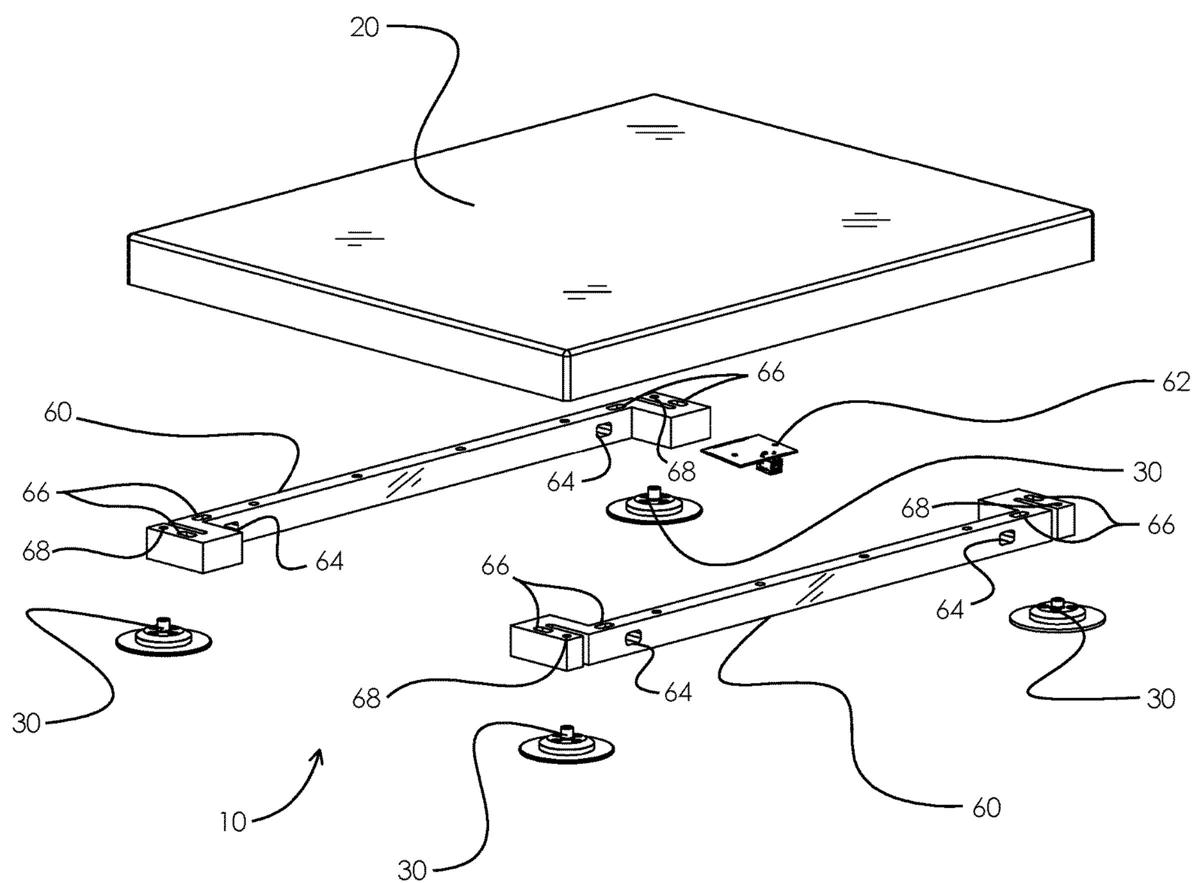
FIG. 4 is an exploded perspective view of the force plate of FIG. 1.

As shown in FIGS. 2 and 3, in the first illustrative embodiment, the body portion 44 of the foot attachment component 40 of each swivel foot assembly 30 comprises a ball portion (see FIG. 3), and the receptacle or recess 56 of the foot base component 50 is configured to rotatably receive the ball portion 44 of the foot attachment component 40. For example, in the first illustrative embodiment, the receptacle or recess 56 of the foot base component 50 may have a spherical shape that corresponds to the spherical shape of the ball portion 44 of the foot attachment component 40. In the first illustrative embodiment, as best shown in FIG. 3, the ball portion 44 of the foot attachment component 40 and the receptacle or recess 56 of the foot base component 50 together form a ball-and-socket joint having three degrees of freedom. In addition, as depicted in the first illustrative embodiment of FIGS. 2 and 3, the stem portion 42 of the foot attachment component 40 of the swivel foot assembly 30 comprises a fastener aperture 46 for receiving a fastener (e.g., a screw) for attaching the foot attachment component 40 to the force plate 10. That is, as shown in FIG. 4, the U-shaped end portion of the force transducer beam 60 is provided with an aperture 68 that receives a fastener (e.g., a screw) that attaches the foot attachment component 40 to the force plate 10.

Referring again to FIGS. 2 and 3, it can be seen that, in the first illustrative embodiment, the swivel foot assembly 30 further comprises a top plate component 32 that is attached to the foot base component 50. The top plate component 32 includes an aperture 36 for receiving the stem portion 42 of the foot attachment component 40. Also, as shown in the first illustrative embodiment of FIGS. 2 and 3, the top plate component 32 of the swivel foot assembly 30 is attached to the foot base component 50 by a plurality of fastener members 38 (e.g., a plurality of screws). As best illustrated in the exploded view of FIG. 3, each of the fastener members 38 is inserted into a respective fastener aperture 34 of the top plate component 32 and engages with a corresponding fastener aperture 58 in the foot base component 50 so as to secure the top plate component 32 to the foot base component 50.

Also, as shown in FIGS. 2 and 3, it can be seen that, in the first illustrative embodiment, the foot base component 50 of the swivel foot assembly 30 comprises a central raised portion 54 and a peripheral rim portion 52. In the first illustrative embodiment, the top plate component 32 is attached to the central raised portion 54 of the foot base component 50.

In the first illustrative embodiment, with reference again to FIGS. 1 and 4, the top plate component 20 of the force plate 10 is mounted atop a plurality of force transducers (e.g., two spaced-apart force transducer beams 60) so that the loads being applied to the top surface of the top plate component 20 can be measured. In the illustrated embodiment, each of the force transducer beams 60 has a plurality of load cells with strain gages adhered to outer surfaces thereof for detecting the mechanical strain of the force transducer sensing element imparted thereon by the force(s) applied to the top plate component 20 of the force plate 10.

Also, as best shown in FIG. 4, in the first illustrative embodiment, each of the load cells is provided with a generally rectangular aperture 64, 66 disposed through the beam 60. The apertures 64, 66 significantly increase the sensitivity of the force transducer beam 60 when a load is applied thereto by reducing the cross-sectional area of the transducer beam 60 at the locations of the apertures 64, 66. The horizontal apertures 64 in the force transducer beams 60 are associated with the load cells that measure the vertical force ($F_Z$), while the vertical apertures 66 in the force transducer beams 60 are associated with the load cells that measure the shear forces ($F_X$ and $F_Y$). The processing of the output signals from each of the force transducer beams 60 of the force plate 10 will be described hereinafter. As shown in FIG. 4, the force plate 10 may also comprise a data acquisition/data processing device 62 (i.e., circuit board 62) for performing the signal processing functionality that will be described below.

Figure 5:
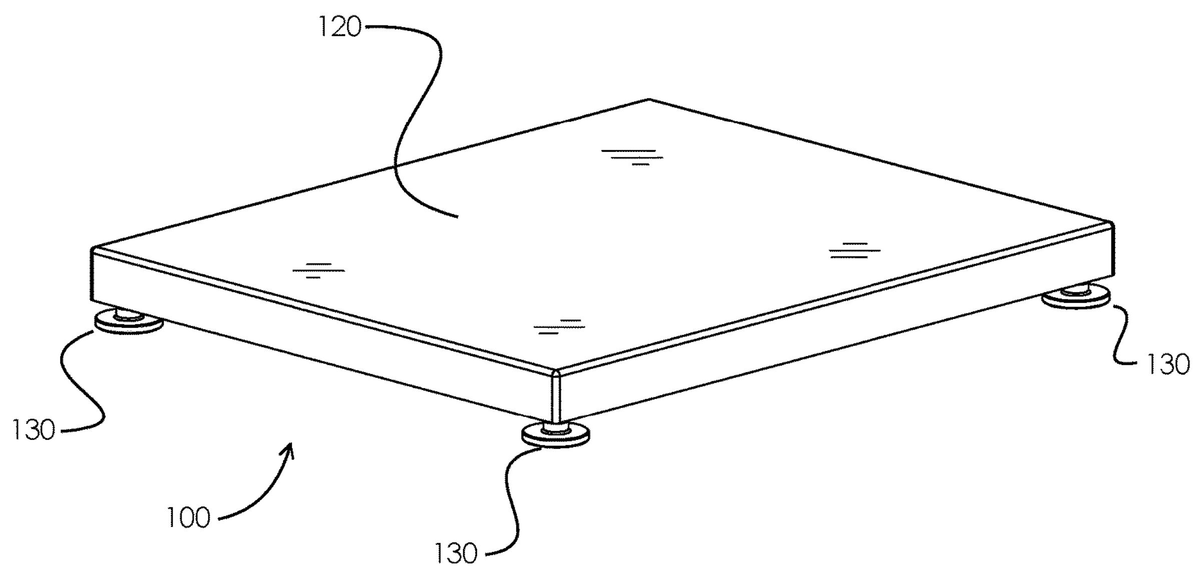
FIG. 5 is a perspective view of a force plate with a plurality of swivel foot assemblies, according to a second illustrative embodiment of the invention.

A second illustrative embodiment of a force plate with a plurality of swivel foot assemblies is seen generally at 100 in FIG. 5. Referring to this figure, it can be seen that, in some respects, the second illustrative embodiment is similar to that of the first illustrative embodiment. Moreover, many elements are common to both such embodiments. For the sake of brevity, the elements that the second embodiment of the force plate has in common with the first embodiment will not be discussed in detail because these components have already been described above.

Like the force plate 10 described above, the force plate 100 of the second illustrative embodiment generally comprises a top plate component 120 with a top surface for receiving at least one portion of the body of a person; at least one force transducer 160 (see FIG. 9), the at least one force transducer 160 configured to sense one or more measured quantities and output one or more signals that are representative of forces and/or moments being applied to the top surface of the force plate 100 by the person; and a plurality of swivel foot assemblies 130 for supporting the force plate 100 on a support surface. In the second illustrative embodiment, referring collectively to FIGS. 6 and 7, each of the plurality of swivel foot assemblies 130 comprises a foot attachment component 140 including a stem portion 142 and a body portion 144, the stem portion 142 of the foot attachment component 140 being attached to the force plate 100; and a foot base component 150 including a receptacle or recess 156 for rotatably receiving the body portion 144 of the foot attachment component 140, the foot base component 150 configured to be disposed on a support surface (e.g., a floor of a building). The plurality of swivel foot assemblies 130 of the force plate 100 are configured to accommodate an uneven support surface on which the force plate 100 is disposed so that a force measurement accuracy of the force plate 100 is not adversely affected by stresses resulting from the uneven support surface (e.g., an uneven floor).

While the force plate 100 of the second illustrative embodiment is provided with a plurality of swivel foot assemblies 130, it is to be understood that, in other embodiments, the force plate 100 may have a single swivel foot assembly 130. In these other embodiments, the other feet of the force plate 100 may be non-swivel type foot assemblies.

Figure 6:
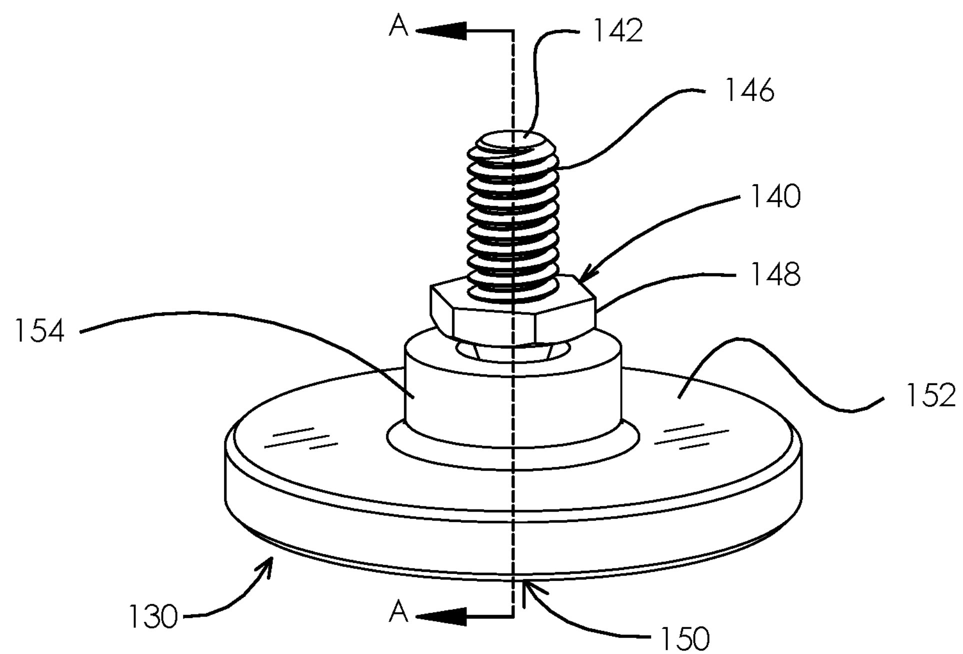
FIG. 6 is an assembled perspective view of one of the swivel foot assemblies illustrated in FIG. 5.
Figure 7:
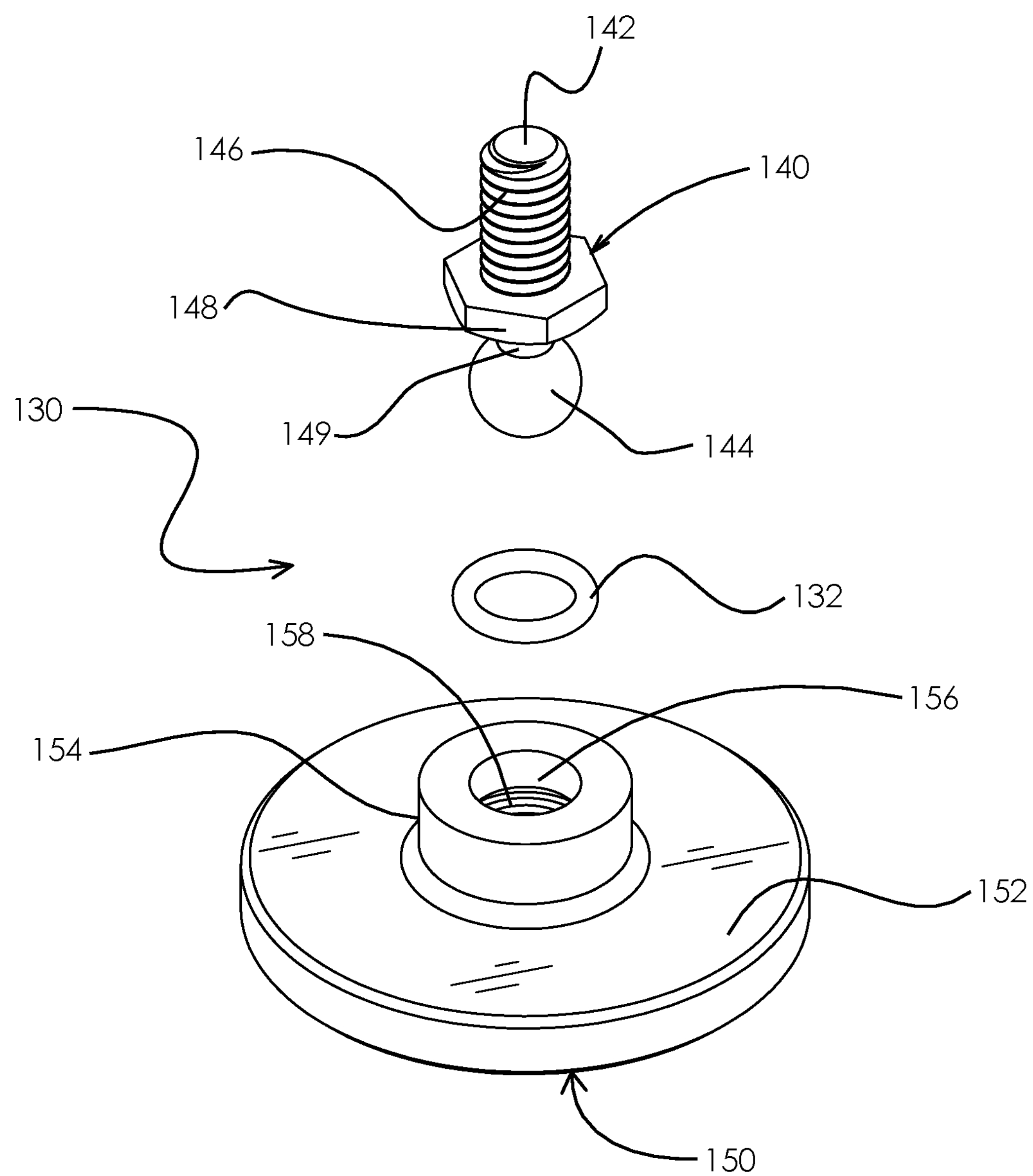
FIG. 7 is an exploded perspective view of the swivel foot assembly illustrated in FIG. 6.
Figure 8:
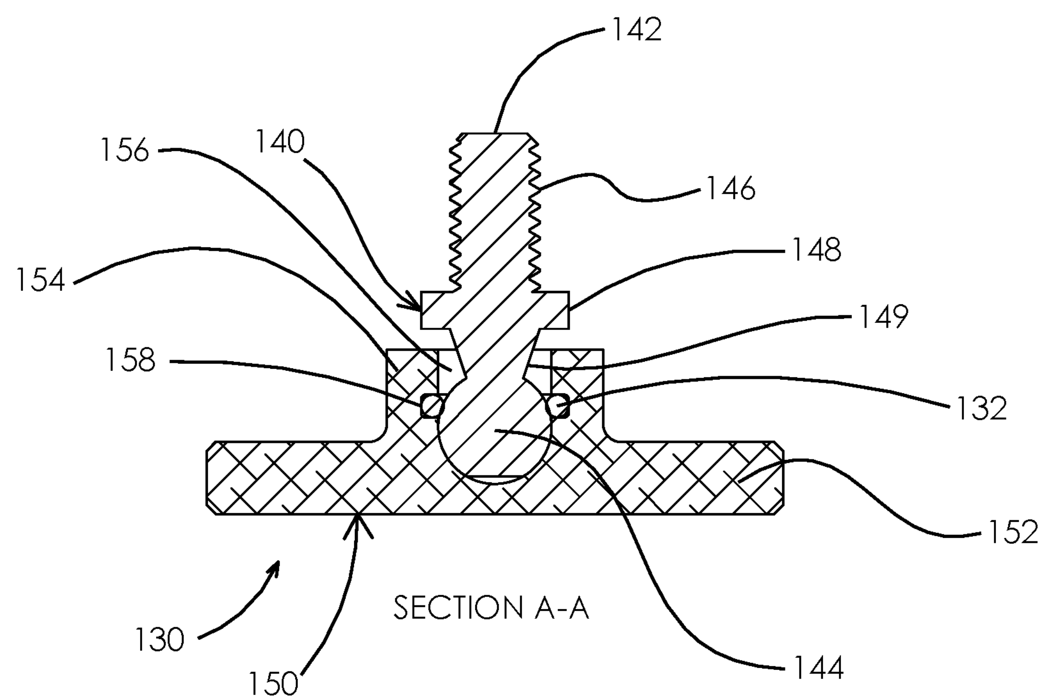
FIG. 8 is a sectional view cut through the swivel foot assembly illustrated in FIG. 6, wherein the section is generally cut along the cutting-plane line A-A in FIG. 6.
Figure 9:
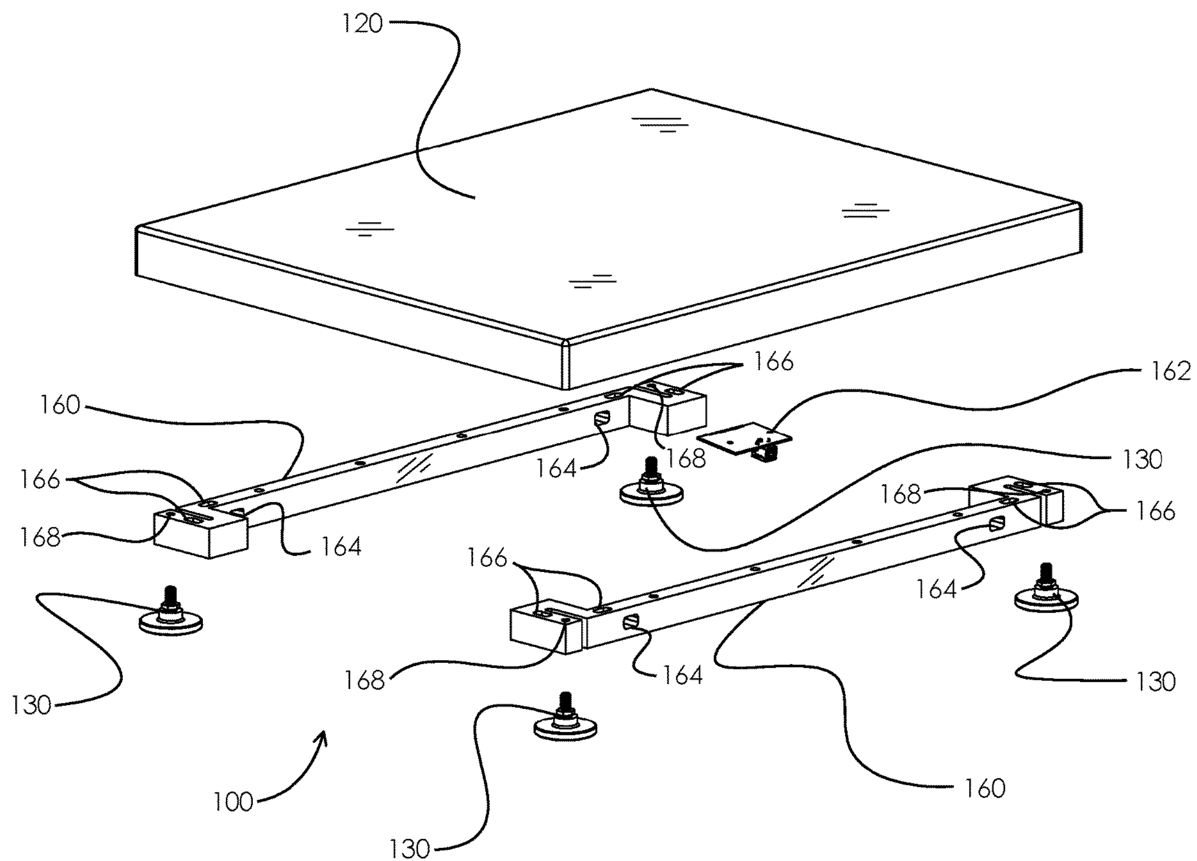
FIG. 9 is an exploded perspective view of the force plate of FIG. 5.

As shown in FIGS. 6 and 7, in the second illustrative embodiment, the body portion 144 of the foot attachment component 140 of each swivel foot assembly 130 comprises a ball portion (see FIG. 7), and the receptacle or recess 156 of the foot base component 150 is configured to rotatably receive the ball portion 144 of the foot attachment component 140. For example, in the second illustrative embodiment, the receptacle or recess 156 of the foot base component 150 may have a spherical shape that corresponds to the spherical shape of the ball portion 144 of the foot attachment component 140. In the second illustrative embodiment, as best shown in FIG. 7, the ball portion 144 of the foot attachment component 140 and the receptacle or recess 156 of the foot base component 150 together form a ball-and-socket joint having three degrees of freedom. In addition, as depicted in the second illustrative embodiment of FIGS. 6 and 8, the stem portion 142 of the foot attachment component 140 of the swivel foot assembly 130 comprises a fastener stud 146 that attaches the foot attachment component 140 to the force plate 100. In particular, in the second illustrative embodiment, the fastener stud 146 attaches the foot attachment component 140 to the force transducer beam 160 of the force plate 100. That is, as shown in FIG. 9, the U-shaped end portion of the force transducer beam 160 is provided with an internally threaded aperture 168 that threadingly engages the externally threaded fastener stud 146.

Referring again to FIGS. 6 and 8, it can be seen that, in the second illustrative embodiment, the stem portion 142 of the foot attachment component 140 of the swivel foot assembly 130 further comprises a hexagonal collar portion 148 disposed at a bottom of the fastener stud 146 that limits an insertion depth of the fastener stud 146 into the force transducer beam 160 of the force plate 100. As shown in FIGS. 7 and 8, the ball portion 144 of the foot attachment component 140 is attached to the hexagonal collar portion 148 by a frustoconical portion 149.

Also, as best shown in FIGS. 7 and 8, it can be seen that, in the second illustrative embodiment, the swivel foot assembly 130 further comprises an O-ring member 132 for retaining the ball portion 144 of the foot attachment component 140 in the receptacle or recess 156 of the foot base component 150.

Also, as shown in FIGS. 6-8, it can be seen that, in the second illustrative embodiment, the foot base component 150 of the swivel foot assembly 130 comprises a central collar portion 154 and a peripheral rim portion 152 surrounding the central collar portion 154. As shown in FIGS. 7 and 8, the receptacle 156 that receives the ball portion 144 is disposed in the central collar portion 154 of the foot base component 150. In addition, as shown in FIGS. 7 and 8, the central collar portion 154 of the foot base component 150 further comprises an O-ring groove 158 that receives the O-ring member 132. In FIGS. 7 and 8, it can be seen that the O-ring groove 158 is open to the receptacle 156.

In the second illustrative embodiment, with reference again to FIGS. 5 and 9, the top plate component 120 of the force plate 100 is mounted atop a plurality of force transducers (e.g., two spaced-apart force transducer beams 160) so that the loads being applied to the top surface of the top plate component 120 can be measured. In the illustrated embodiment, each of the force transducer beams 160 has a plurality of load cells with strain gages adhered to outer surfaces thereof for detecting the mechanical strain of the force transducer sensing element imparted thereon by the force(s) applied to the top plate component 120 of the force plate 100. Also, as best shown in FIG. 9, in the second illustrative embodiment, each of the load cells is provided with a generally rectangular aperture 164, 166 disposed through the beam 160. The apertures 164, 166 significantly increase the sensitivity of the force transducer beam 160 when a load is applied thereto by reducing the cross-sectional area of the transducer beam 160 at the locations of the apertures 164, 166. The horizontal apertures 164 in the force transducer beams 160 are associated with the load cells that measure the vertical force ($F_Z$), while the vertical apertures 166 in the force transducer beams 160 are associated with the load cells that measure the shear forces ($F_X$ and $F_Y$). The processing of the output signals from each of the force transducer beams 160 of the force plate 100 will be described hereinafter. As shown in FIG. 9, the force plate 100 may also comprise a data acquisition/data processing device 162 (i.e., circuit board 162) for performing the signal processing functionality that will be described below.

Now, the acquisition and processing of the load data carried out by the force plates 10, 100 will be described. Initially, a load is applied to the top surface of the top plate component 20, 120 of the force plate 10, 100 by a subject disposed thereon. The load is transmitted from the top plate component 20, 120 to the force transducer beams 60, 160 disposed underneath the top plate component 20, 120. In the illustrative embodiments, the force transducer beams 60, 160 of the force plate 10, 100 include a plurality of strain gages wired in one or more Wheatstone bridge configurations, wherein the electrical resistance of each strain gage is altered when the associated portion of the associated force transducer beam 60, 160 undergoes deformation resulting from the load (i.e., forces and/or moments). For each plurality of strain gages disposed on the force transducer beams 60, 160, the change in the electrical resistance of the strain gages brings about a consequential change in the output voltage of the Wheatstone bridge (i.e., a quantity representative of the load being applied to the measurement surface). In the illustrative embodiments, the force transducer beams 60, 160 output raw output voltages (signals) in analog form, and then the raw output voltages (signals) are converted into digital voltage signals by the acquisition/data processing device 62, 162. In the illustrative embodiments, the acquisition/data processing device 62, 162 also is used to increase the magnitudes of the transducer output voltages. In the illustrative embodiments, the data acquisition/data processing device 62, 162 may comprise a microprocessor, memory, and data storage device(s), as well as additional hardware components.

In the illustrative embodiments, after the data acquisition/data processing device 62, 162 converts the analog output voltages from the force transducer beams 60, 160 into digital output voltages and increases the magnitudes of the transducer output voltages, the data acquisition/data processing device 62, 162 transforms the digital output voltages into output forces and/or moments by multiplying the digital output voltage signals by a calibration matrix. After which, the force components (e.g., $F_X$, $F_Y$, $F_Z$) exerted on the top surface of the top plate component 20, 120 of the force plate 10, 100 are determined by the data acquisition/data processing device 62, 162.

In the illustrative embodiments, the force measurement assembly with the swivel foot assemblies 30, 130 is in the form of force plate 10, 100 that measures the three force components (e.g., $F_X$, $F_Y$, $F_Z$). However, in other embodiments, the force measurement assembly with the swivel foot assemblies 30, 130 may be in the form of a balance plate that outputs the vertical force component ($F_Z$) and two moment components (e.g., $M_X$, $M_Y$). In yet other embodiments, the force measurement assembly with the swivel foot assemblies 30, 130 may be in the form of a force plate 10, 100 that outputs all three force components (e.g., $F_X$, $F_Y$, $F_Z$) and all three moment components (e.g., $M_X$, $M_Y$, $M_Z$).

Advantageously, in the illustrative embodiments, the swivel foot assemblies 30, 130 of the force plate 10, 100 prevent the load measurement (i.e., of the vertical force $F_Z$) from being affected by stresses on the force transducer beams 60, 160 resulting from moments developed at the locations of the foot members 30, 130. In the illustrative embodiment, the swivel foot assemblies 30, 130 help to ensure that the accuracy of the force transducer output is not adversely affected by any moment that develops at any of the foot members 30, 130. In essence, the swivel foot assemblies 30, 130 allow the force transducer beams 60, 160 to behave like cantilever beams.

It is readily apparent that the aforedescribed swivel foot assembly 30, 130 for a force plate 10, 100 or balance plate offers numerous advantages. In particular, the force plate or balance plate swivel foot assembly 30, 130 is configured to accommodate an uneven support surface on which the force plate 10, 100 or balance plate is disposed so that the force measurement accuracy of the force plate 10, 100 or balance plate is not adversely affected by stresses resulting from the uneven support surface.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A swivel foot assembly for a force plate or balance plate, the swivel foot assembly comprising:

a foot attachment component including a stem portion and a body portion, the stem portion of the foot attachment component configured to be attached to a force plate or balance plate; and a foot base component including a receptacle for receiving the body portion of the foot attachment component, the foot base component configured to be disposed on a support surface the foot base component further including a central collar portion and a peripheral rim portion surrounding the central collar portion, and the receptacle is disposed in the central collar portion;

wherein the swivel foot assembly is configured to accommodate an uneven support surface on which a force plate or balance plate is disposed so that a force measurement accuracy of the force plate or balance plate is not adversely affected by stresses resulting from the uneven support surface.

2. The swivel foot assembly according to claim 1, wherein the body portion of the foot attachment component comprises a ball portion, and the receptacle of the foot base component is configured to rotatably receive the ball portion of the foot attachment component.

3. The swivel foot assembly according to claim 2, wherein the ball portion of the foot attachment component and the receptacle of the foot base component together form a ball-and-socket joint having three degrees of freedom.

4. The swivel foot assembly according to claim 1, wherein the stem portion of the foot attachment component comprises a fastener stud for attaching the foot attachment component to the force plate or balance plate.

5. The swivel foot assembly according to claim 4, wherein the stem portion of the foot attachment component further comprises a collar portion disposed at a bottom of the fastener stud for limiting an insertion depth of the fastener stud into a component of the force plate or balance plate.

6. The swivel foot assembly according to claim 1, wherein the stem portion of the foot attachment component comprises a fastener aperture for receiving a fastener for attaching the foot attachment component to the force plate or balance plate.

7. The swivel foot assembly according to claim 1, further comprising a top plate component, the top plate component being attached to the foot base component, and the top plate component including an aperture for receiving the stem portion of the foot attachment component.

8. The swivel foot assembly according to claim 7, wherein the top plate component is attached to the foot base component by one or more fastener members.

9. The swivel foot assembly according to claim 7, wherein the central collar portion of the foot base component comprises a central raised portion, and the top plate component is attached to the central raised portion of the foot base component.

10. A force plate or balance plate with a swivel foot assembly, the force plate or balance plate comprising:

a top surface for receiving at least one portion of the body of a person;

at least one force transducer, the at least one force transducer configured to sense one or more measured quantities and output one or more signals that are representative of forces and/or moments being applied to the top surface of the force plate or balance plate by the person; and at least one swivel foot assembly, the at least one swivel foot assembly including:

a foot attachment component including a stem portion and a body portion, the stem portion of the foot attachment component attached to the force plate or balance plate, the stem portion of the foot attachment component of the at least one swivel foot assembly comprising a fastener stud that attaches the foot attachment component to the force plate or balance plate, and the stem portion of the foot attachment component of the at least one swivel foot assembly further comprising a collar portion disposed at a bottom of the fastener stud that limits an insertion depth of the fastener stud into a component of the force plate or balance plate; and a foot base component including a receptacle for receiving the body portion of the foot attachment component, the foot base component configured to be disposed on a support surface;

wherein the at least one swivel foot assembly is configured to accommodate an uneven support surface on which the force plate or balance plate is disposed so that a force measurement accuracy of the force plate or balance plate is not adversely affected by stresses resulting from the uneven support surface.

11. The force plate or balance plate according to claim 10, wherein the body portion of the foot attachment component of the at least one swivel foot assembly comprises a ball portion, and the receptacle of the foot base component is configured to rotatably receive the ball portion of the foot attachment component.

12. The force plate or balance plate according to claim 11, wherein the ball portion of the foot attachment component and the receptacle of the foot base component together form a ball-and-socket joint having three degrees of freedom.

13. The force plate or balance plate according to claim 10, wherein the foot base component of the at least one swivel foot assembly comprises a central collar portion and a peripheral rim portion surrounding the central collar portion, and the receptacle is disposed in the central collar portion.

14. A force plate or balance plate with a swivel foot assembly, the force plate or balance plate comprising:

a top surface for receiving at least one portion of the body of a person;

at least one force transducer, the at least one force transducer configured to sense one or more measured quantities and output one or more signals that are representative of forces and/or moments being applied to the top surface of the force plate or balance plate by the person; and at least two swivel foot assemblies disposed beneath the at least one force transducer, each of the at least two swivel foot assemblies including:

a foot attachment component including a stem portion and a body portion, the stem portion of the foot attachment component attached to the force plate or balance plate; and a foot base component including a receptacle for receiving the body portion of the foot attachment component, the foot base component configured to be disposed on a support surface;

wherein the at least two swivel foot assemblies are configured to accommodate an uneven support surface on which the force plate or balance plate is disposed so that a force measurement accuracy of the force plate or balance plate is not adversely affected by stresses resulting from the uneven support surface.

15. The force plate or balance plate according to claim 14, wherein the stem portion of the foot attachment component of at least one of the swivel foot assemblies is attached to the at least one force transducer of the force plate or balance plate.

16. The force plate or balance plate according to claim 14, wherein the body portion of the foot attachment component of at least one of the swivel foot assemblies comprises a ball portion, and the receptacle of the foot base component is configured to rotatably receive the ball portion of the foot attachment component.

17. The force plate or balance plate according to claim 16, wherein the ball portion of the foot attachment component and the receptacle of the foot base component together form a ball-and-socket joint having three degrees of freedom.

18. The force plate or balance plate according to claim 14, wherein the stem portion of the foot attachment component of at least one of the swivel foot assemblies comprises a threaded fastener that attaches the foot attachment component to the force plate or balance plate, the threaded fastener threadingly engaging the force plate or balance plate so as to enable the top surface of the force plate or balance plate to be disposed at a varying height relative to the support surface depending on a thread insertion depth of the threaded fastener.

19. The force plate or balance plate according to claim 18, wherein the stem portion of the foot attachment component of the at least one of the swivel foot assemblies further comprises a collar portion disposed at a bottom of the threaded fastener that limits the thread insertion depth of the threaded fastener into a component of the force plate or balance plate.

20. The force plate or balance plate according to claim 14, wherein the foot base component of at least one of the swivel foot assemblies comprises a central collar portion and a peripheral rim portion surrounding the central collar portion, and the receptacle is disposed in the central collar portion.

* * * * *